United States Patent [19]

O'Connor et al.

[11] Patent Number: 4,552,943
[45] Date of Patent: Nov. 12, 1985

[54] MODIFIED POLYURETHANE LIQUID POLYMER COMPOSITIONS

[75] Inventors: James M. O'Connor, Clinton; Donald L. Lickei, Wallingford; Michael L. Rosin, Madison, all of Conn.

[73] Assignee: Olin Corporation, Cheshire, Conn.

[21] Appl. No.: 588,821

[22] Filed: Mar. 12, 1984

Related U.S. Application Data

[60] Division of Ser. No. 506,179, Jun. 20, 1983, Pat. No. 4,463,158, which is a division of Ser. No. 364,575, Apr. 1, 1982, Pat. No. 4,439,577, which is a continuation-in-part of Ser. No. 203,213, Nov. 3, 1980, abandoned.

[51] Int. Cl.$^4$ .............................................. C08G 18/16
[52] U.S. Cl. ...................................... 528/50; 524/590; 528/60; 528/65; 528/75; 528/85
[58] Field of Search ....................... 528/50, 60, 65, 75, 528/85; 524/425, 874, 445, 451, 452, 492, 495, 875, 590

[56] References Cited

U.S. PATENT DOCUMENTS 4,439,577  3/1984  O'Connor ............................ 524/425
4,463,158  7/1984  O'Connor et al. ..................... 528/75

*Primary Examiner*—Jacob Ziegler
*Attorney, Agent, or Firm*—William D. Sabo; Thomas P. O'Day

[57] ABSTRACT

A novel, heat curable, liquid polymer composition is disclosed which comprises a modified polyurethane oligomer containing terminal ethylenic unsaturation and a free radical generating catalyst. In a preferred embodiment, the polymer composition further includes at least one additional component selected from a reinforcing agent and a filler.

14 Claims, No Drawings

MODIFIED POLYURETHANE LIQUID POLYMER COMPOSITIONS

This is a division of application Ser. No. 506,179, filed June 20, 1983, now U.S. Pat. No. 4,463,158, which is a division of application Ser. No. 364,575, filed Apr. 1, 1982, now U.S. Pat. No. 4,439,577, which is, in turn, a continuation-in-part of application Ser. No. 203,213, filed Nov. 3, 1980, now abandoned.

This invention relates to a select liquid polymer composition containing a modified polyurethane oligomer having terminal ethylenic unsaturation.

In recent years, there has been a steady increase in the use of reinforced plastic materials for exterior components in automotive construction. Further increases in the utilization of plastics can be expected as automobile manufacturers continue to strive to meet vehicle weight reduction goals.

In the area of rigid plastic automotive components, fiberglass-reinforced thermosetting polyester resins have been extensively employed. This can be attributed to their overall physical capabilities (e.g., dimensional stability, strength, high temperature resistance, and paint adhesion). Other advantages include facility of handling and machining. However, these polyester systems still present certain deficiencies such as a brittle nature, which can lead to severe impact and fatigue problems. There is also a need to improve surface characteristics and shrinkage control. To overcome these problems, various additives have been introduced into polyester sheet molding compounds (SMC) and bulk molding compounds (BMC). For example, in U.S. Pat. No. 4,020,036 issued to Aubrey South, Jr. on Apr. 26, 1977, liquid polymers, such as polybutadiene, are added in order to toughen polyester products. However, since these materials are not inherently compatible with polyester, these additives cannot be added to the polyester, until it is time to mix the resin with the fiberglass. Saturated diacids or long-chain glycols also have been used in preparing polyester resins; the resulting products have been flexibilized, but, at the cost of lower mechanical and thermal properties.

Another approach involves the introduction of polyurethane sytems into polyester resins. In U.S. Pat. No. 4,062,826 issued to Francis Gowland Hutchinson et al. on Dec. 13, 1977, precursors of a cross-linked polyurethane are polymerized within a mixture of ethylenically unsaturated polyester and vinyl monomer to form a product with an interpenetrating polyurethane gel network within the polyester cross-linked structure. While higher impact properties are reported to be achieved, the fine surface finish required for automotive body part applications is not accomplished. See Forger, G., *Toughened SMC*, Plastics World, page 63 (June 1978).

Now it has been discovered, according to the present invention, that a heat curable liquid polymer composition can be prepared comprising a modified polyurethane oligomer containing terminal ethylenic unsaturation and a free radical generating catalyst. Such a composition features the advantages of a one-component storage stable system that requires only heat for activation; the cured composition is useful in preparing a wide variety of coatings and castings. In a preferred form of the invention, the polymer composition may include at least one additional component selected from a reinforcing agent and a filler. The cured plastic products feature improved impact properties and are suitable for many of the same utilities as thermoset polyester resin compositions such as part for automotive body applications.

The polyurethane oligomer that is utilized according to the invention is prepared by first reacting an organic polyisocyanate with an isocyanate reactive group-containing unsaturated monomer using standard procedures and in such proportions as to yield an isocyanate-terminated prepolymer of controlled molecular weight having a free NCO content ranging from about 0.5% to about 30%. Preferably, the prepolymer has a free NCO content ranging from about 10% to about 20%.

Any suitable organic polyisocyanate, or mixture of polyisocyanates, may be employed in preparing the polyurethane oligomer. Illustrative are toluene diisocyanate, such as the 80:20 and the 65:35 mixtures of the 2,4- and 2,6-isomers, ethylene diisocyanate, propylene diisocyanate, methylene-bis (4-phenyl)isocyanate, methylene-bis (4-cyclohexyl) isocyanate, xylene diisocyanate, 3,3'-bitoluene4,4'-diisocyanate, hexamethylene diisocyanate, naphthalene-1,5-diisocyanate, isophorone diisocyanate, the polymeric isocyanates such as polyphenylene polymethylene isocyanate, and the like, and mixtures thereof. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20.

Suitable isocyanate reactive group-containing unsaturated monomers include hydroxyl group-containing or amino group-containing acrylates, subtituted acrylates such as methacrylates, acrylamides, and subtituted acrylamides, such as methacrylamides, and mixtures thereof. Illustrative isocyanate reactive group-containing unsaturated monomers are hydroxyethyl acrylate, hydroxypropyl acrylate, hydroxyethyl methacrylate, hydroxyethyl acrylamide, hydroxypropyl acrylamide, hydroxyethyl methacrylamide, and the like. Acrylates and methacrylates are preferred, with hydroxyethyl acrylate, hydroxypropyl acrylate and hydroxyethyl methacrylate being the most preferred.

To form the polyurethane oligomer that is utilized according to the invention, the prepared isocyanate-terminated prepolymer, as defined above, is then reacted with a polyol. The reaction is carried out using methods well known in the art and employing such relative proportions of the reactants so as to achieve an oligomer product having an equivalent ratio of NCO to active hydrogen from about 0.5/1 to about 2/1, preferably from about 0.7/1 to about 1.5/1, and most preferably from about 0.8/1 to about 1.2/1. By reaction of the isocyanate-terminated prepolymer with the polyol, a controlled molecular weight polyurethane oligomer with terminal reactive unsaturation is produced.

Preferably, the reaction is accelerated by employing a catalyst; common urethane catalysts, e.g., tertiary amines and metal compound such as stannous octoate or dibutyltin dilaurate may be used. Any catalytic amount may be employed; illustratively, such amount varies, depending on the particular catalyst utilized, from about 0.01% to about 1% by weight of the polyurethane oligomer. It is also preferred to carry out the reaction in the presence of a reactive copolymerizable solvent. Suitable copolymerizable solvents include vinylidene compounds such as styrene, vinyl toluene, methacrylic esters, acrylic esters, divinyl benzene, and the like, familiar to those skilled in the art. The amount of copolymerizable solvent employed may be varied over a wide range. Generally, however, the copolymerizable solvent is employed in an amount of from about 0 to about 100 parts by weight per 100 parts by weight of the polyurethane oligomer of the present invention.

The polyol reactant used in the polyurethane oligomer formation comprises a select combination of polyols, i.e., a high functionality polyol and a chain extender. More in detail, the high functionality polyol is selected from polyether polyols and mixtures of two or more such compounds. The high functionality polyol, or mixture of high functionality polyols, should have an average equivalent weight ranging from about 75 to about 500. Preferably, the average equivalent weight is about 100 to about 200. The average functionality of the high functionality polyol or high functionality polyol blend is at least about 3, and preferably about 3.3 to about 6.

Suitable high functionality polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the high functionality polyether polyol reactant comprise a carbohydrate or a carbohydrate derivative. Illustrative are sucrose, dextrose, methyl glucoside, mixtures thereof, and mixtures of sucrose or dextrose or methyl glucoside with at least one aliphatic diol or triol. Exemplificative of the latter are water, ethylene glycol, propylene glycol, the butylene glycols, glycerol, trimethylolpropane, triethylolpropane, the alkanolamines, and the like, and mixtures thereof.

A preferred group of polyhydric initiators for use in preparing the high functionality polyether polyol reactant is one which comprises mixtures of sucrose or dextrose or methyl glucoside with an aliphatic triol, preferably glycerol.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 75 to about 500, preferably about 100 to about 200. The catalyst is thereafter preferably removed, leaving a high functionality polyether polyol which is ready for use in preparing the polyurethane oligomer of the invention.

As indicated above, in forming the polyurethane oligomer, a chain extender is included in the polyol reactant. These chain extenders have an average equivalent weight ranging from about 31 to about 4,000, preferably from about 31 to about 500, and an average functionality of about 2. Suitable chain extenders include: (a) low molecular weight diols, such as ethylene glycol, butane diol, pentane diol, hexane diol, 2-ethyl-1,3-hexane diol, dipropylene glycol, diethylene glycol, triethylene glycol, bisphenol A, and the like, and mixtures thereof; and (b) polyether diols, such as propylene oxide diols, propylene oxide-ethylene oxide diols, etc., and mixtures thereof. Dipropylene glycol, tripropylene glycol and 2-ethyl-1,3-hexane diol are particularly preferred. Usually a proportion of chain extender is employed which ranges from about 20 to about 1,500, and preferably from about 50 to about 900, parts by weight per every 100 parts by weight of the high functionality polyol.

The modified polyurethane oligomer liquid polymer system is polymerized and cured in the presence of a heat activated free radical generating catalyst. The actual curing conditions may vary over wide ranges and are generally dependent on the nature and amount of the particular catalyst employed. Suitable free radical generating catalysts include peroxide or azo type compounds, known to those in the art. Typical peroxide catalysts are illustrated by organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Typical azo compounds are azobis-isobutyronitrile, 2-t-butylazo-2-cyano-4-methylpentane, and 4-t-butylazo-4-cyano-valeric acid. The preferred catalysts are peroxide catalysts. In particular, preferred peroxide catalysts are t-butyl peroctoate, t-butyl perbenzoate, and mixtures thereof. Any suitable catalytic amount may be employed; however, the catalyst generally is used in an amount from about 0.1 to about 10 parts by weight per 100 parts by weight of the polyurethane oligomer.

The composition of the present invention also may include other standard ingredients, if desired, such as internal mold release agents, e.g., calcium, zinc, magnesium, or sodium stearate. Low shrink or impact additives also may be included, if desired. Pigments, dyes, stabilizers, thixotropes, and various other additives familiar to those skilled in thermosetting polyester technology also may be added.

In one preferred embodiment of the invention, the composition also contains at least one of a filler or a reinforcement material, and preferably both. Any material known to those in the art as being suitable as a filler may be employed. Generally, a variety of materials, e.g., finely divided solids including $CaCO_3$, clay, alumina, talc, glass microspheres, and the like, may be utilized. Also, any suitable reinforcement material may be used, such as chopped fiberglass, carbon fibers, asbetos fibers, boron nitride whiskers, and the like. The amount of filler generally included in the formulation may vary considerably, but usually ranges from about 20 to about 400, and preferably from about 100 to about 220, parts by weight per 100 parts by weight of the polyurethane oligomer. The amount of reinforcing agent added to the formulation may also vary over a wide range; however, a typical formulation will generally contain from about 10 to about 150, and preferably from about 60 to about 130, part by weight per 100 parts by weight of the polyurethane oligomer.

The following examples are provided to further illustrate the invention. All parts are by weight unless otherwise specified.

PREPARATION OF POLYURETHANE OLIGOMER

EXAMPLE 1

To 87.0 grams (1.0 eq.) of diisocyanate, 141.8 grams of styrene and 0.71 grams of hydroquinone were added dropwise with stirring 65.0 grams (0.5 eq.) of unsaturated monomer over a period of 30 minutes. The reaction temperature rose from 25° to 30° C., and the mixture was stirred without heating for 60 minutes. To this mixture was added dropwise with stirring a mixture of 36.7 grams (0.25 eq.) of a high functionality polyether polyol and 24.0 grams (0.25 eq.) of a chain extender over a period of 45 minutes. The resulting mixture was stirred for 45 minutes without heating, when 0.68 ml of dibutyltin dilaurate was added. The reaction temperature climbed from 33° to 65° C. within 5 minutes. The mixture was then heated to 70° C. and was stirred at 70° C. for 3 hours. The product had a viscosity of 1,130 cps at 26° C.

The polyether polyol used had a molecular weight of about 650 and was prepared by condensing a sucrose/glycerol mixture with propylene oxide to a final hydroxyl number of about 375. The diisocyanate was a mixture of toluene diisocyanate isomers (80:20 mixture of 2,4/2,6-isomers). The chain extender was tripropylene glycol. The unsaturated monomer was hydroxypropyl acrylate.

EXAMPLES 2-24

Additional polyurethane oligomers were prepared employing the same conditions as outlined in Example 1. Different reactants and proportions of reactants were used, however, to form prepolymers. These prepolymers were reacted with suitable proportion of polyol reactant to produce oligomers according to the invention. Table I outlines the oligomer compositions prepared according to Examples 2-24.

TABLE I

| | | OLIGOMER COMPOSITIONS | | | | | | | |
|---|---|---|---|---|---|---|---|---|---|
| | Diiso- | Unsaturated Monomer (eq.) | | Polyol Reactant | | | | | |
| | cyan- | | | High Functionality | | | | | |
| Example | ate [1] (eq.) | A [2] | B [3] | Polyol (eq.) | | Chain Extender (eq.) | | | |
| | | | | C [4] | D [5] | E [6] | F [7] | G [8] | H [9] |
| 1 | 1.0 | — | 0.5 | 0.25 | — | — | — | 0.25 | — |
| 2 [10] | 1.0 | 0.5 | — | 0.25 | — | — | — | 0.25 | — |
| 3 | 2.0 | 1.0 | — | 0.75 | — | 0.25 | — | — | — |
| 4 | 2.0 | 1.0 | — | 0.5 | — | 0.5 | — | — | — |
| 5 | 2.0 | 1.0 | — | — | 0.5 | 0.5 | — | — | — |
| 6 | 2.0 | — | 1.0 | — | 0.5 | 0.5 | — | — | — |
| 7 | 2.0 | — | 1.0 | 0.5 | — | 0.5 | — | — | — |
| 8 | 2.0 | — | 1.0 | — | 0.5 | 0.5 | — | — | — |
| 9 | 2.0 | — | 1.0 | — | 0.5 | — | 0.5 | — | — |
| 10 | 2.0 | — | 1.0 | 0.75 | — | 0.25 | — | — | — |
| 11 | 2.0 | — | 1.0 | — | 0.75 | 0.25 | — | — | — |
| 12 | 2.0 | 1.0 | — | — | 0.5 | — | 0.5 | — | — |
| 13 | 2.0 | 1.0 | — | 0.5 | — | — | 0.5 | — | — |
| 14 | 2.0 | 1.0 | — | 0.75 | — | — | — | — | 0.25 |
| 15 | 2.0 | 1.0 | — | — | 0.75 | — | — | — | 0.25 |
| 16 | 2.0 | 1.0 | — | — | 0.75 | 0.25 | — | — | — |
| 17 | 2.0 | — | 1.0 | 0.50 | — | — | 0.5 | — | — |
| 18 | 2.0 | — | 1.0 | 0.50 | — | — | — | 0.5 | — |
| 19 | 2.0 | — | 1.0 | — | 0.75 | — | — | 0.25 | — |
| 20 | 2.0 | — | 1.0 | 0.75 | — | — | — | 0.25 | — |
| 21 | 2.0 | — | 1.0 | — | 0.50 | — | — | 0.5 | — |
| 22 | 2.0 | 1.0 | — | — | 0.50 | — | — | 0.5 | — |
| 23 | 2.0 | 1.0 | — | 0.5 | — | — | — | 0.5 | — |
| 24 | 2.0 | 1.0 | — | 0.75 | — | — | — | 0.25 | — |

[1] The diisocyanate is a mixture of toluene diisocyanate isomers (80:20 mixture of 2,4/2,6-isomers).
[2] Hydroxyethyl acrylate.
[3] Hydroxypropyl acrylate.
[4] A polyether polyol having a molecular weight of about 650 and an average functionality of about 4.25 and prepared by condensing a sucrose/glycerol mixture with propylene oxide to a final hydroxyl number of about 375.
[5] A polyether polyol having a molecular weight of about 480 and an average functionality of about 4.54 and prepared by condensing a sucrose/glycerol mixture with propylene oxide to a final hydroxyl number of about 530.
[6] 2-Ethyl-1,3-hexane diol.
[7] Dipropylene glycol.
[8] Tripropylene glycol.
[9] A polyether polyol having a molecular weight of about 650 and prepared by end-capping a propoxylated dipropylene glycol precursor with ethylene oxide to a final hydroxyl number of about 173.
[10] Instead of 141.8, 137.1 grams of styrene were used.

EXAMPLE 25

To 174 grams (2.0 eq.) of diisocyanate and 271.5 grams of styrene were added dropwise with stirring 132 grams (1.0 eq.) of unsaturated monomer over a period of 1 hour. The mixture was stirred without heating for 1 hour. To this mixture was added dropwise with stirring a mixture of 55.6 grams (0.625 eq.) of a high functionality polyether polyol and 45.6 grams (0.625 eq.) of a chain extender over a period of 1 hour. The resulting mixture was stirred for 1 hour without heating, when 0.2 ml of dibutyltin dilaurate was added. The mixture was then heated to 70° C. and was stirred at 70° C. for 3 hours.

The polyether polyol used had a molecular weight of about 480 and was prepared by condensing a sucrose/glycerol mixture with propylene oxide to a final hydroxyl number of about 530. The diisocyanate was a mixture of toluene diisocyanate isomers (80:20 mixture of 2,4/2,6-isomers). The chain extender was 2-ethyl-1,3-hexane diol. The unsaturated monomer was hydroxypropyl acrylate.

EXAMPLE 26

A. To 348 grams (4.0 eq.) of diisocyanate were added dropwise with stirring 232 grams (2.0 eq.) of unsaturated monomer over a period of 105 minutes. The reaction temperature was maintained below 50° C. during the addition period by external cooling with a cooled water bath. The mixture was stirred for one additional hour below 35° C. At the end of this period, 387 grams of styrene were added to the mixture. No free unsaturated monomer was detected in the sample after standing overnight.

B. To a mixture of 26.3 grams (0.25 eq.) of a high functionality polyether polyol and 18.3 grams (0.25 eq.) of a chain extender in 29.7 grams of styrene were added 242 grams (0.50 eq.) of the intermediate from part A dropwise over a period of 30 minutes. After stirring for 1 hour at room temperature, 0.5 ml of stannous octoate was added. The reaction temperature climbed to 50° C. after 20 minutes. The mixture was stirred for an additional 40 minutes after the peak exotherm was reached, at which point 50 mg of hydroquinone were added and the mixture was heated to 75° C. The mixture was stirred at 75° C. for 2 hours. At the end of the heating period, no isocyanate peak was observed in an infrared spectrum. The product had a viscosity of 2,960 cps at 22° C.

The diisocyanate was a mixture of toluene diisocyanate isomers (80:20 mixture of 2,4/2,6-isomers). The unsaturated monomer was hydroxyethyl acrylate. The polyether polyol used had a molecular weight of about 480 and was prepared by condensing a sucrose/glycerol mixture with propylene oxide to a final hydroxyl number of about 530. The chain extender was 2-ethyl-1,3-hexane diol.

PREPARATION OF POLYURETHANE MOLDINGS

D3574; izod—ASTM D256; and coefficient of thermal expansion—ASTM D696.

TABLE II

POLYURETHANE MOLDING FORMULATION (SMC/BMC)

| Component | Parts by Weight |
| --- | --- |
| Polyurethane Oligomer | 100 (40% Styrene) |
| Tertiary Butyl Perbenzoate | 0.5 |
| Tertiary Butyl Peroctoate [1] | 0.5 |
| Zinc Stearate | 3.0 |
| Calcium Carbonate | 185 |
| ¼ Inch Glass | 75 |

[1] Commericially available from Lupersol Co. under the designation "PDO", understood to consist of 50% tertiary butyl peroctoate and 50% dioctyl phthalate.

TABLE III

PHYSICAL PROPERTIES OF POLYURETHANE OLIGOMER COMPOSITES

| Example | Polyurethane Oligomer | Tensile Strength (psi) | Flexural Strength (psi) | Flexural Modulus × $10^6$ (psi) | Izod (ft.-lb./in.) Notched | Izod (ft.-lb./in.) Unnotched | Surface [1] (1–10) | Gloss [2] (%) |
| --- | --- | --- | --- | --- | --- | --- | --- | --- |
| 27 | Example 3 | 6240 | 10,100 | 0.870 | 12.5 | 13.6 | 5.5 | 70 |
| 28 | Example 4 | 6320 | 14,400 | 1.04 | 16.1 | 17.4 | 5.0 | 60 |
| 29 | Example 18 | 3140 | 12,000 | 1.30 | 9.1 | 16.1 | 6.0 | 65 |
| 30 | Example 5 | 4310 | 12,800 | 0.900 | 8.4 | 17.0 | 4.5 | 60 |
| 31 | Example 13 | 2910 | 9,700 | 1.30 | 11.0 | 10.0 | 7.5 | 75 |
| 32 | Example 12 | 3690 | 13,200 | 1.46 | 12.6 | 12.2 | 6.5 | 70 |
| 33 | Example 16 | 4900 | 16,200 | 1.23 | 9.5 | 9.3 | 5.0 | 50 |
| 34 | Example 17 | 3930 | 15,600 | 1.52 | 11.7 | 12.7 | 5.5 | 65 |
| 35 | Example 10 | 3930 | 11,200 | 1.48 | 8.2 | 13.6 | 7.0 | 70 |
| 36 | Example 7 | 6140 | 12,800 | 1.20 | 9.6 | 10.6 | 5.0 | 50 |
| 37 | Example 11 | 4400 | 10,500 | 1.15 | 10.2 | 11.3 | 7.5 | 85 |
| 38 | Example 6 | 6160 | 11,000 | 0.98 | 9.0 | 12.0 | 5.0 | 75 |
| 39 | Example 19 | 5200 | 15,200 | 1.34 | 9.7 | 12.8 | 5.5 | 60 |
| 40 | Example 9 | 3810 | 13,400 | 1.35 | 11.0 | 13.4 | 5.5 | 60 |
| 41 | Example 8 | 5680 | 13,600 | 1.19 | 12.4 | 10.4 | 7.0 | 85 |

[1] The surface is rated subjectively from 1–10, 10 having the smoothness of glass while 1 is fairly rough and uneven surface.
[2] Gloss is a subjective value.

EXAMPLES 27–41

Test panels were prepared containing polyurethane oligomers prepared according to Examples 3–13 and 16–19. The molding formulation used is listed in Table II below. The following procedure was followed in the preparation of the cured composites.

a. Into a high shear mixing device were added the polyurethane oligomer, styrene, catalyst, and mold release agent.

b. The filler was added gradually and mixed until a homogeneous paste was obtained.

c. Next chopped fiberglass was gradually added to the paste in a two-roll mill and the mix was worked the minimal length of time to achieve good wet out of the glass without significant breakdown.

d. The uncured mix was then placed in a mold between the platens of a compression molding machine and cured under pressure (2,000 psi) for 3 minutes at 300°–325° F.

e. Alternatively to (d), the mixture may be added by a hopper device to the screw system of an injection molding device to produce an injection molded part, or the mix may be made up on an SMC machine for later compression or injection molding.

The physical properties of panels prepared in this manner are included in Table III below. The physical properties were determined in accordance with standard test procedures: Flexural modulus and flexural strength—ASTM D790; tensile strength—ASTM

PREPARATION OF POLYURETHANE MOLDINGS

EXAMPLES 42–52

Test panels were prepared containing polyurethane oligomers prepared according to Examples 3, 4, 6, 10–13 and 16–19. The following procedure was followed in the preparation of the cured panels.

a. The polyurethane oligomer was mixed with a free radical generating catalyst[1], and the resulting mixture was degassed by placement in a vacuum dessicator at about 1–10 torr pressure for a period of approximately 1–2 minutes or until initial foaming subsided.

[1] The panels were prepared using 0.5% tertiary butyl peroctoate (commercially available from Lupersol Co. under the designation "PDO", understood to consist of 50% tertiary butyl peroctoate and 50% dioctyl phthalate) and 0.5% tertiary butyl perbenzoate as initiator.

b. The degassed mixture was poured into a mold formed by glass plates coated with a liquid mold release agent, such as "MR515" commercially available from Greenchem Product, Inc., and held apart by one-sixteenth inch spacers.

c. The mold was then placed in an oven at 120° C. for 1 hour.

The physical properties of panels prepared in this manner are included in Table IV below. The physical properties were determined in accordance with standard test procedures: Flexural modulus and flexural strength—ASTM D790; tensile strength—ASTM D3574; izod—ASTM D256; and coefficient of thermal expansion—ASTM D696.

TABLE IV
PHYSICAL PROPERTIES OF CURED POLYURETHANE OLIGOMERS

| Example | Polyurethane Oligomer | Tensile Strength (psi) | Flexural Strength (psi) | Flexural Modulus × $10^6$ (psi) | Izod (ft.-lb./in.) Notched | Izod (ft.-lb./in.) Unnotched |
|---|---|---|---|---|---|---|
| 42 | Example 3 | 5690 | 12,700 | 0.526 | 1.59 | 4.00 |
| 43 | Example 4 | 5380 | 17,000 | 0.541 | 1.69 | 3.20 |
| 44 | Example 6 | 5840 | 13,000 | 0.540 | 1.86 | 4.00 |
| 45 | Example 10 | 6280 | 16,400 | 0.495 | 1.73 | 4.50 |
| 46 | Example 11 | 6310 | 18,600 | 0.567 | 1.54 | 4.37 |
| 47 | Example 12 | 4670 | 13,600 | 0.535 | 1.80 | 3.75 |
| 48 | Example 13 | 5060 | 16,200 | 0.525 | 2.00 | 4.00 |
| 49 | Example 16 | 9910 | 13,200 | 0.414 | 1.87 | 4.95 |
| 50 | Example 17 | 8500 | 14,700 | 0.461 | 1.71 | 4.47 |
| 51 | Example 18 | 6880 | 17,300 | 0.529 | 1.60 | 4.43 |
| 52 | Example 19 | 7600 | 18,300 | 0.546 | 1.84 | 4.22 |

What is claimed is:

1. A process for preparing a polyurethane polymer product comprising mixing a polyurethane oligomer, a heat activated free radical generating catalyst, and at least one additional component selected from the group consisting of a reinforcing agent and a filler to a homogeneous blend, and then heating said mixture at a temperature adequate to activate said catalyst and cure said mixture, said polyurethane oligomer having an equivalent ratio of NCO to active hydrogen from about 0.5/1 to about 2/1 and being prepared by reacting
   (a) an isocyanate-terminated prepolymer having a final free NCO content ranging from about 0.5% to about 30% which is the product of reacting
      (1) an organic polyisocyanate with
      (2) an isocyanate reactive group-containing unsaturated monomer selected from the group consisting of hydroxyl group-containing or amino group-containing:
         (i) acrylates,
         (ii) substituted acrylates,
         (iii) methacrylates,
         (iv) substituted methacrylates, and
         (v) mixtures thereof, with
   (b) a polyol reactant comprising
      (1) a high functionality polyol having an average equivalent weight of from about 75 to about 500 and an average functionality of at least about 3, said high functionality polyol being prepared by reacting an alkylene oxide, or a mixture of alkylene oxides, with a polyhydric initiator comprising a carbohydrate or a carbohydrate derivative, and
      (2) a chain extender having an average equivalent weight from about 31 to about 4,000 and an average functionality of about 2, said chain extender being employed in an amount ranging from about 20 to about 1,500 parts by weight per 100 parts by weight of said high functionality polyol.

2. The process of claim 1, wherein:
said high functionality polyol has an average equivalent weight of about 100 to about 200,
said isocyanate-terminated prepolymer has a final free NCO content ranging from about 10% to about 20%, and
said polyurethane oligomer has an equivalent ratio of NCO to active hydrogen from about 0.8/1 to about 1.2/1.

3. The process of claim 2, wherein:
said high functionality polyol has an average functionality of about 3.3 to about 6, and
said unsaturated monomer is selected from the group consisting of hydroxyethyl acrylate, hydroxypropyl acrylate, hydroxyethyl methacrylate, hydroxyethyl acrylamide, hydroxypropyl acrylamide, hydroxyethyl methacrylamide, and mixtures thereof.

4. The process of claim 3, wherein said high functionality polyol is prepared by reacting an alkylene oxide selected from the the group consisting of propylene oxide and mixtures of propylene oxide and ethylene oxide with a polyhydric initiator selected from the group consisting of a mixture of sucrose and an aliphatic triol, a mixture of dextrose and an aliphatic triol, and a mixture of a methyl glucoside with an aliphatic triol.

5. The process of claim 4, wherein said chain extending agent is selected from the group consisting of dipropylene glycol, tripropylene glycol and 2-ethyl-1,3-hexanediol.

6. The process of claim 1, wherein said polyurethane oligomer is prepared by reacting said isocyanate-terminated prepolymer with said polyol reactant in the presence of a copolymerizable solvent.

7. The process of claim 6, wherein said copolymerizable solvent is styrene.

8. The process of claim 7, wherein said reaction is accelerated by employing a urethane catalyst.

9. The process of claim 8, wherein said mixture includes, per 100 parts by weight of said polyurethane oligomer, from about 100 to about 220 parts by weight of a filler and from about 60 to about 130 parts by weight of a reinforcing agent.

10. The polyurethane polymer product prepared according to the process of claim 1.

11. The polyurethane polymer product prepared according to the process of claim 2.

12. The polyurethane polymer product prepared according to the process of claim 5.

13. The polyurethane polymer product prepared according to the process of claim 6.

14. The polyurethane polymer product prepared according to the process of claim 9.

* * * * *